United States Patent [19]
Youngs

[11] 3,827,306
[45] Aug. 6, 1974

[54] SOFT WALL HYDROMETER

[76] Inventor: Homer S. Youngs, 8718 Dunway Dr., La Jolla, Calif. 92037

[22] Filed: July 19, 1971

[21] Appl. No.: 163,922

Related U.S. Application Data

[63] Continuation-in-part of Ser. No. 868,564, Oct. 22, 1969, Pat. No. 3,604,272, which is a continuation-in-part of Ser. No. 583,244, Sept. 30, 1966, abandoned.

[52] U.S. Cl.................................. 73/450, 73/452
[51] Int. Cl. ............................................ G01n 9/14
[58] Field of Search................ 73/30, 32, 433–437, 73/440–454, 309, 425.4 P

[56] References Cited
UNITED STATES PATENTS

| | | | |
|---|---|---|---|
| 794,697 | 7/1905 | Beck et al............................. | 73/451 |
| 1,697,455 | 1/1929 | Burningham et al. ............ | 73/434 X |
| 1,800,532 | 4/1931 | Howard ........................... | 73/433 X |
| 2,537,825 | 1/1951 | Hardin................................. | 73/441 |

FOREIGN PATENTS OR APPLICATIONS

| | | | |
|---|---|---|---|
| 91,065 | 2/1968 | France.................................... | 73/30 |
| 184,789 | 4/1923 | Great Britain....................... | 73/452 |
| 596,874 | 1/1948 | Great Britain....................... | 73/451 |
| 1,219,714 | 6/1966 | Germany......................... | 73/425.4 P |
| 1,474,026 | 2/1967 | France.................................... | 73/30 |

Primary Examiner—Jerry W. Myracle
Attorney, Agent, or Firm—Lyon & Lyon

[57] ABSTRACT

A specific gravity sensing instrument in which a closed cell having, at least in part, highly compliant walls is completely filled with either a reference liquid, and is completely immersed in a sample liquid to be measured, or conversely the cell is completely filled with the sample liquid and completely immersed in the reference liquid, in either case the specific gravity of the sample liquid is determined by the buoyancy of the cell.

8 Claims, 28 Drawing Figures

PATENTED AUG 6 1974 3,827,306

INVENTOR.
HOMER S. YOUNGS
BY
Lyon & Lyon
ATTORNEYS

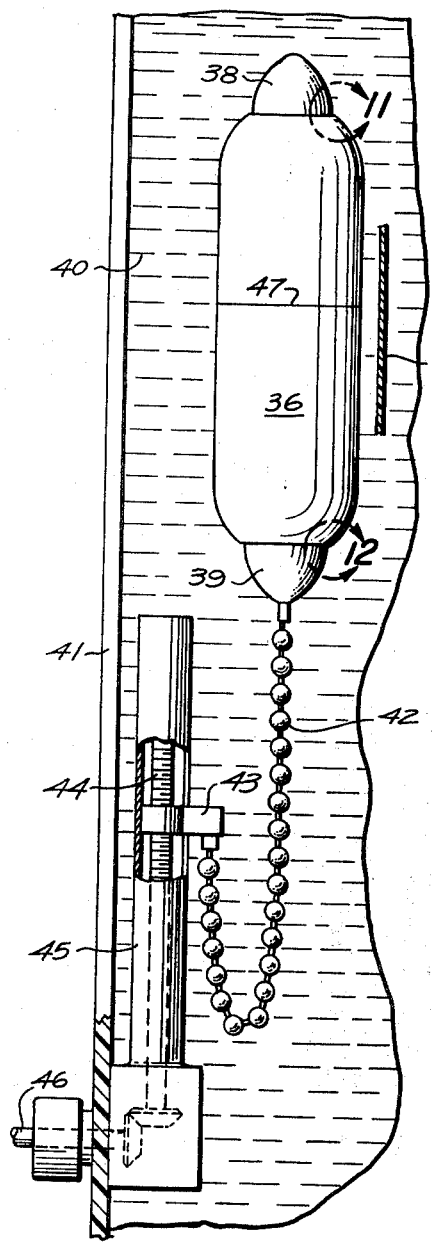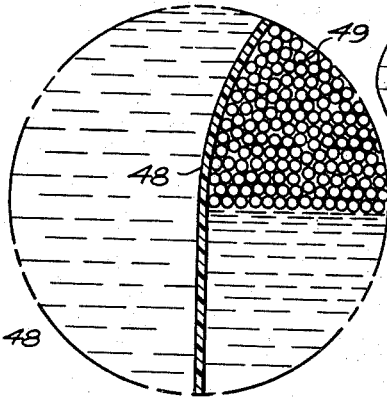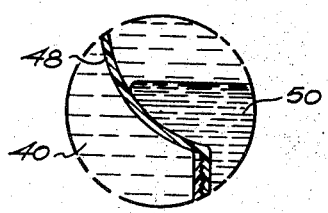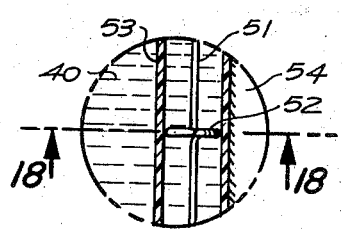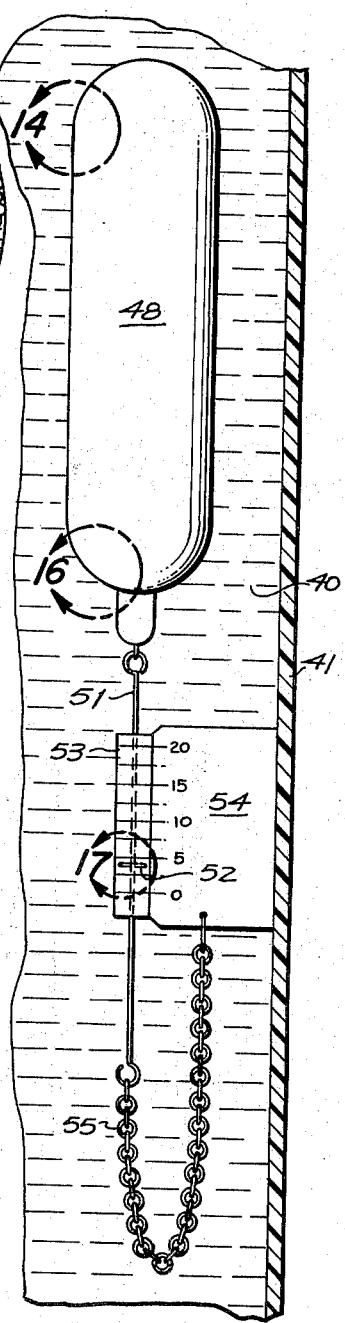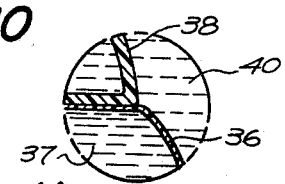

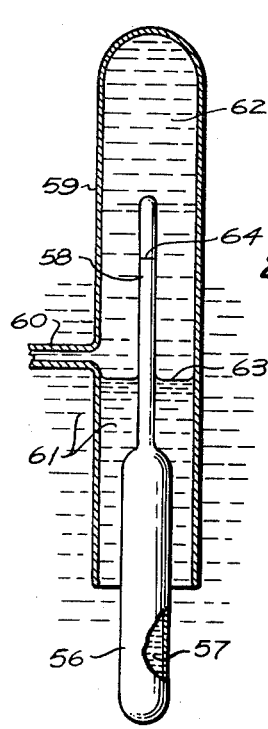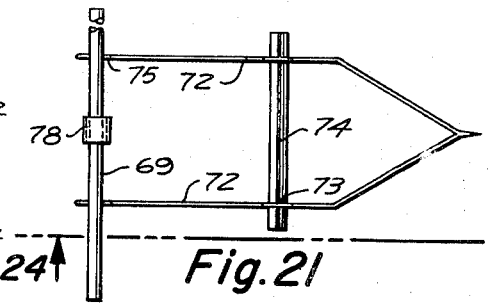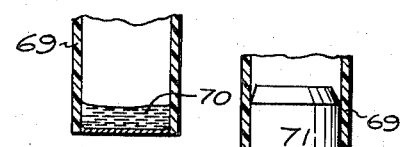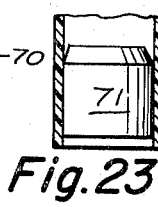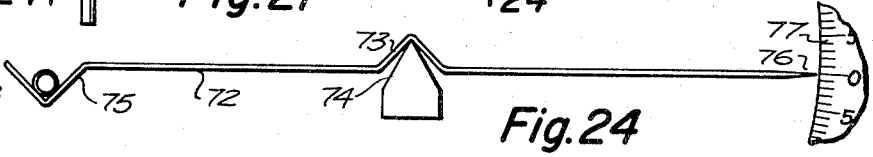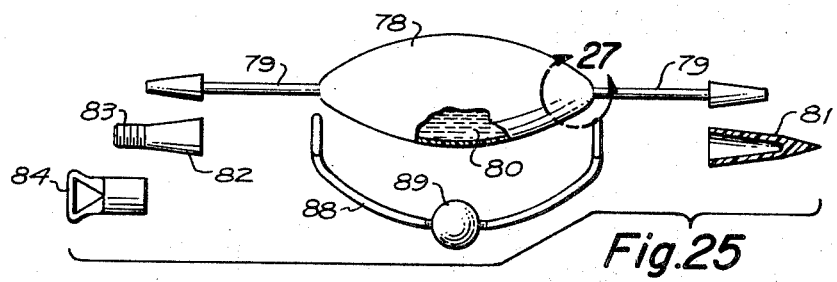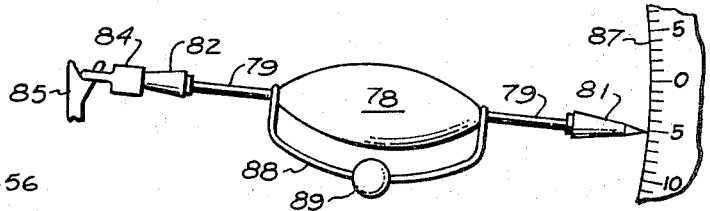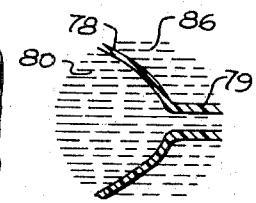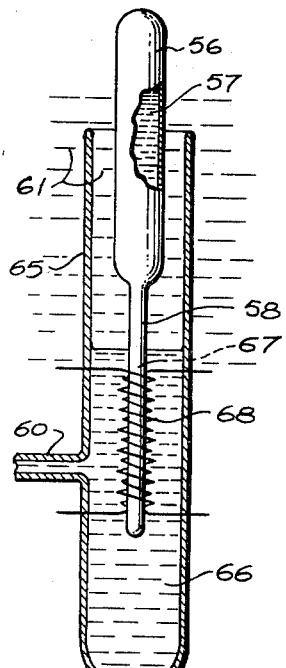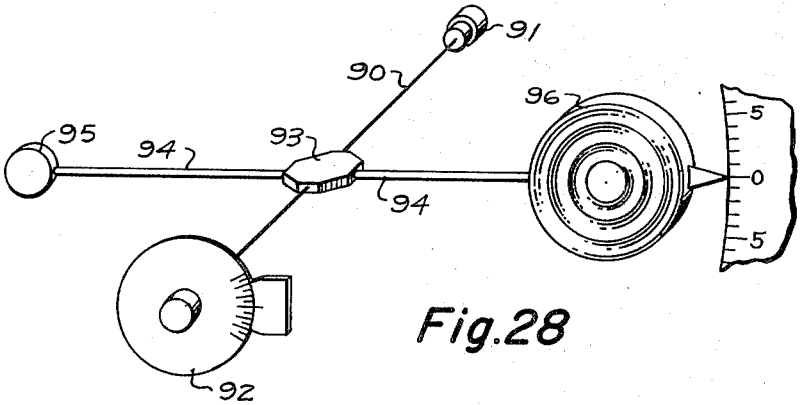

SOFT WALL HYDROMETER

The present invention is a Continuation-In-Part of my copending application, Ser. No. 868,564, now U.S. Pat. No. 3,604,272, filed Oct. 22, 1969 entitled Soft Wall Hydrometer which, in turn, is a Continuation-In-Part of a previous application, Ser. No. 583,244, filed Sept. 30, 1966 entitled Soft Wall Hydrometer, now abandoned.

Several constructions are disclosed in which:

A construction discloses a cell immersed in a reference liquid and conduits connected to the cell permitting continuous or intermittent flow of the sample liquid through the cell.

Another construction discloses a sealed cell of reference liquid immersed in a flowing sample liquid.

Other constructions disclose a sealed cell containing the sample liquid and precise quantities of either or both a buoyant or weighted counterbalancing media and a variable external counterbalance is immersed in a reference liquid.

Other constructions disclose a cell having a stem and completely filled with a reference liquid, the cell being partly immersed in a sample liquid and the remaining portion immersed in a second reference or comparison liquid immiscible with the sample liquid.

Other constructions disclose a relatively small or, if desired, an extremely small cell, containing the sample liquid and forming a part of or resting on a scale, the cell and scale being completely immersed in a reference liquid.

Another construction discloses a cell containing a reference liquid or sample liquid suspended by a torsion wire, both the cell and torsion wire being completely immersed in the other liquid.

BACKGROUND OF THE INVENTION

The terms "density" and "specific gravity" are frequently confused. The international Critical Tables of Numerical Data, Physics, Chemistry and Technology (abbreviated ICT), a publication of the National Research Council of the United States by McGraw-Hill Book Company, is considered in its field authoritative over dictionaries or comparable publications.

The First Edition (1926) of ICT defines at page 41:

"*Specific gravity.* $-(d_{t_1}{}^{t_2})$. The ratio of the mass of a certain volume of the substance at the temperature $t_2$ to that of the same volume of a reference substance (usually water) at temperature $t_1$. Frequently, but incorrectly, called density."

and at page 36:

"*Density.*—1. Volume density $=dQ/dv$, $dQ=$ amount of the physical quantity considered which is contained in the element of volume $dv$. 2. Density of a substance, $(d)$, $(D)$, is $dm/dv$, $m=$ mass. When, on a particular scale of operation, the density varies from point to point, it may be that on a larger scale it will not; then the density on the larger scale may properly be called the apparent density (sometimes called bulk density) when operations on the smaller scale are being considered." The underlined portions in the above quotation identify the particular density of interest in this application.

The most common type of hydrometer is a sealed and ballasted hardwall cell which is partly immersed in the liquid to be measured (for example, an electrolyte contained in a storage battery) and where the amount of emergence of the cell is an indication of density. For this type of use accuracy is not too critical and usually no compensation is made for temperature. Insofar as known, no compensation for pressure has ever been taught.

If temperature compensation is desired, it has been suggested in Beck et al. U.S. Pat. No. 794,697 to provide a cell having a flexible wall and containing a temperature compensating liquid which expands with heat reducing its density but increasing the volume of the cell. Another approach to temperature compensation suggested in this patent involves metallic walls which expand or contract with temperature to effect compensation. In both of these approaches to temperature compensation, the stem of the hydrometer is air filled and intended to project from the liquid different amounts to indicate density of the electrolyte, if that be the liquid to be measured. Or, alternatively, the hydrometer is connected by a line to a weight measuring balance located above the electrolyte.

The devices shown by Beck et al. are known as emergent stem or plummet and external balance hydrometers. No compensation is made for the effect of pressure variation.

Another patent concerned solely with temperature compensation is the emergent stem hydrometer shown in the French Patent to Jaine 734,684 which utilizes a temperature compensating liquid within a cell having a flexible wall.

The teaching by Beck et al. and Jaine as well as the definitions quoted by ICT ignore the effect of pressure and the possibility of selecting a particular reference liquid unique to the sample liquid thus preventing meaningful specific gravity measurements under conditions departing significantly from atmospheric pressure, and where temperatures are outside the range where water is in a liquid state.

This invention is directed to soft wall hydrometers; more particularly to a hydrometer which measures specific gravity as distinguished from density, and operated under the condition that the hydrometer contains no chambers of gas free to assume the pressure of the liquid contained in or surrounding the cell. That is its internal space is totally filled with liquid and is totally immersed in a liquid, either liquid being a reference liquid and the other a sample liquid.

The present invention opens the hydrometry to routine use at pressures that differ from one atmosphere, the standard but unstated condition in the ICT definition. The soft wall hydrometer as here envisioned permits a highly accurate specific gravity measurement where reference and sample liquids are at the same temperature and pressure to the level of accuracy demanded by the design requirements of the hydrometer instrument and its use.

For the purpose of this invention, a more meaningful equation for Specific Gravity than that given in the quoted ICT definition is as follows:

$$SG_{tpr} = D_{tps}/D_{tpr}$$

where:
$SG$ = Specific Gravity
$D$ = density
$t$ = temperature during test
$p$ = pressure during test
$s$ = sample liquid
$r$ = reference liquid The invention is summarized in the following objects:

First, to provide a soft wall hydrometer which is operable under a wide range of temperatures and pressures without sacrifice of precise measurement and which, in fact, permits more accurate measurement of specific gravity of liquids than has herebefore been feasible or possible except under accurately controlled laboratory conditions.

Second, to provide a hydrometer, which includes embodiments especially adapted for the measurement of a flowing sample liquid which may flow internally or externally of the cell, the hydrometer having minimal hysteresis effects and thus being sensitive to rapid changes in specific gravity.

Third, to provide a hydrometer, embodiments of which may be adapted to the measurement of extremely minute differences in specific gravity, for example, in the measurement of water pollution as little as one part per million.

Fourth, to provide a hydrometer, embodiments of which may be adapted to the direct specific gravity measurement of extremely small samples of liquid, contained in expendable cells; such as, sweat, tears, urine and other body fluids including these of small laboratory animals.

Fifth, to provide a soft wall hydrometer, wherein the reference liquid may be a selected reference sample of the liquid to be measured to minimize thermal expansion differences or differences in compressivity between the two liquids as the temperature or pressure may vary during test.

Sixth, to provide a soft wall hydrometer which includes auxiliary positive or negative, or both types of counterbalance elements which enable the net thermal expansivity of compressivity of the cell to be closely matched to either the reference liquid or the sample liquid.

Seventh, to provide a soft wall hydrometer wherein the density of the wall of the cell itself as well as its thermal expansivity or its compressivity, and the density of the reference liquid as well as its thermal expansivity or its compressivity may be matched; so that, in effect, the properties of the cell wall are cancelled with the result that the measurement is a comparison of the two liquids as if the intervening wall were not present.

DESCRIPTION OF THE DRAWINGS

FIG. 1 being taken through 1—1 of FIG. 2 and showing the case in section and the hydrometer in plan; FIG. 2 being taken through 2—2 of FIG. 1 with the case in section and the hydrometer in side elevation.

FIG. 3 being taken through 3—3 of FIG. 4 with the surrounding case in section and the hydrometer in plan; FIG. 4 being taken through 4—4 of FIG. 3 showing the case in the section and the hydrometer in side elevation; FIG. 5 being an enlarged fragmentary sectional view taken through 5—5 of FIG. 3; FIG. 6 being an enlarged fragmentary sectional view taken through 6—6 of FIG. 3; and FIG. 7 being a fragmentary side view corresponding to FIG. 6 showing a modified form of a hydrometer support.

FIGS. 10, 11 and 12 illustrate an embodiment of the hydrometer immersed in the liquid to be measured; FIG. 10 being a fragmentary sectional view of the container for the liquid to be measured with the hydrometer shown in side elevation, portions however being in section; FIG. 11 being an enlarged fragmentary sectional view taken within circle 11 of FIG. 10; and FIG. 12 being a fragmentary sectional view taken within circle 12 of FIG. 10.

FIGS. 13 through 18 illustrate another embodiment of the hydrometer immersed in a liquid to be measured; FIG. 13 being a fragmentary sectional view of the container for the liquid with the hydrometer shown in side elevation; FIG. 14 being a greatly enlarged fragmentary sectional view taken within 14—14 of FIG. 13; FIG. 15 being a greatly enlarged sectional view of one of the balancing elements utilized in the hydrometer; FIG. 16 being an enlarged fragmentary sectional view taken within circle 16 of FIG. 13; FIG. 17 being an enlarged fragmentary sectional view taken within circle 17 of FIG. 13; and FIG. 18 being a fragmentary sectional view taken through 18—18 of FIG. 17.

FIG. 19 is an essentially diagrammatical view partially in section and partially in side elevation showing a further modified form of the hydrometer in which the hydrometer is supported in the sample liquid and a portion extends into an immiscible companion liquid of lesser density than the sample liquid.

FIG. 20 is an essentially diagrammatical view showing a further embodiment of the hydrometer partially in section and partially in side elevation in which the hydrometer is immersed in an inverted position within the sample liquid, a portion extending downwardly into an immiscible companion liquid of greater density.

FIGS. 21 through 24 illustrate a further embodiment of the hydrometer in which the liquid to be measured is contained in a small tube which may be of capillary proportions; FIG. 21 being a plan view of the hydrometer mounted on a scale; FIG. 22 being a greatly enlarged fragmentary sectional view of the hydrometer tube showing one end thereof provided with a highly compliant semi-solid seal; FIG. 23 being a similar enlarged fragmentary sectional view showing a freely slideable plug therein; and FIG. 24 being an enlarged side view of the hydrometer and its scale taken through 24—24 of FIG. 21.

FIGS. 25 through 27 illustrate a further embodiment of the hydrometer in which the hydrometer is incorporated in a balance arm of a scale mechanism; FIG. 25 being an exploded side view thereof with portions in section; FIG. 26 being a side view thereof showing the components assembled and FIG. 27 being an enlarged fragmentary sectional view taken within circle 27 of FIG. 25.

FIG. 28 is a perspective view showing a further embodiment of the hydrometer arranged for support by a torsion wire.

Figure 1:
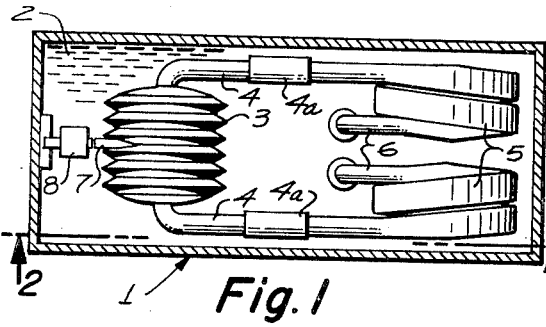
FIGS. 1 and 2 illustrate one form of the soft wall hydrometer in which the liquid to be measured flows continuously or intermittently through the hydrometer.
Figure 2:
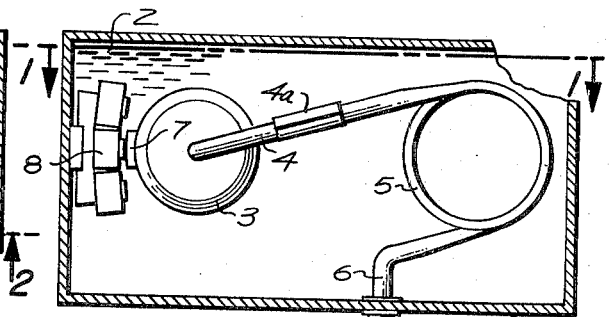
Figure 3:
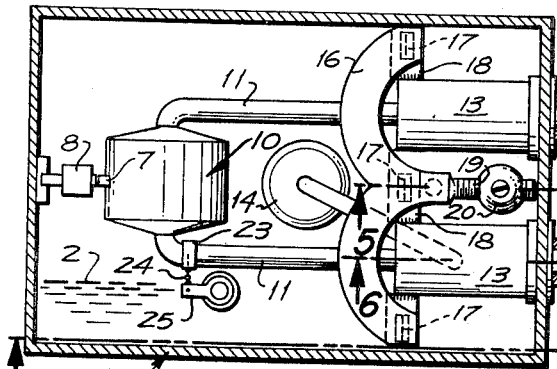
FIGS. 3 through 7 illustrate another embodiment of the hydrometer for measuring the specific gravity of a liquid flowing either continuously or intermittently through the hydrometer.
Figure 4:
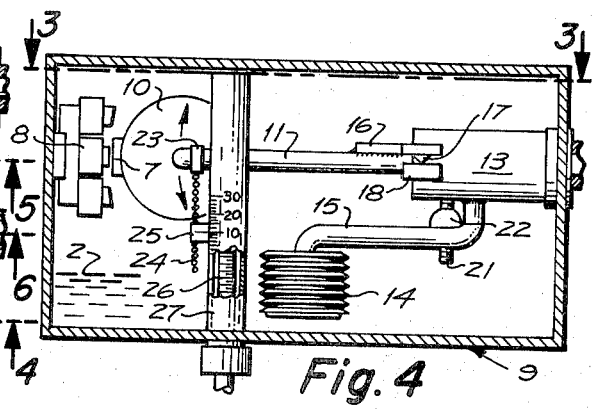
Figure 5:
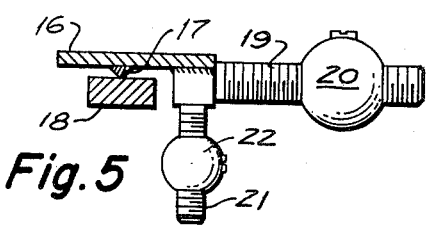

Reference is first directed to FIGS. 1 and 2. The hydrometer here illustrated is intended for measuring continuously or intermittently a sample liquid which flows through the hydrometer. This embodiment includes a vessel 1 containing a reference liquid 2 partially indicated. If the sample liquid is maintained at a high pressure the liquid 2 is maintained at a comparable pressure. Also the reference liquid is maintained at a constant temperature by means not shown.

Positioned in the vessel is a hydrometer cell 3 which for purposes of illustration is shown as a cylinder having accordion walls. The hydrometer cell could be made of metal or plastic material and in either case the cell is highly compliant or yieldable to pressure differentials between its interior and exterior.

Joined to the axial ends of the hydrometer cell is a pair of supporting tubes 4 which turn 90° into parallel relation. Joined to or formed integrally with the supporting tubes 4 are flattened portions which are rolled into similar coils 5. The opposite ends of the coils are joined to mounting tubes 6 which extend downwardly through the vessel 1. One mounting tube is connected to a supply of a sample liquid whereas the other tube forms a return line. Slideable on either or both supporting tubes 4 are weight sleeves 4a which may be split to provide sufficient friction to remain in position.

The hydrometer cell 3 is provided with a pole piece 7 which cooperates with position detecting magnets 8 suitably supported from a wall of the vessel 1.

Operation of the hydrometer shown in FIGS. 1 and 2 is as follows: The tubes 6 are connected to a liquid flow line, such as an oil line, one tube arranged to extract a liquid sample either continuously or intermittently, the other arranged to return the sample. It is essential that the entire hydrometer system including the hydrometer cell and the lines to and from the liquid flow line be completely filled with liquid; that is, to be gas free.

If the hydrometer cell is formed of metal, the cell together with tubes and coils provide excellent means of heat transfer between liquid sample to be tested or measured and the reference liquid 2. Also the compliant wall of the hydrometer cell 3 and to some extent the coils 5 assure good pressure equalization so that the pressure of the sample liquid and the reference liquid 2 are maintained essentially equal with minimal hysteresis effect.

Tests have indicated that an accuracy of 0.01 percent is feasible for sample liquids having a specific gravity near that of water, for example aqueous solutions and petroleum products such as kerosene and gasoline. Also tests indicated that with a 20 second flow time through the hydrometer, good response to change in specific gravity may be attained.

References are now made to FIGS. 3 through 6. This embodiment is also intended for continuous or intermittent measurement of the specific gravity of the gas free liquid flowing through a tube which may be a sampler tube connected to a main flow line for the liquid a sample of which is to be measured. The hydrometer is contained in a vessel 9 similar to the vessel 1 and containing a reference liquid 2 and includes a hydrometer cell 10 which may be identical to the hydrometer cell 3; however, a separate pressure equalizing cell, to be described later, may be used. The hydrometer cell 10 is connected by parallel tubes 11 to a pair of plastic diaphragms 12 fitted in the ends of a pair of horizontally extending mounting cylinders 13 one connected to intake line and the other to a return line of the liquid sample to be measured.

The previously mentioned pressure equalizing cell 14 is connected to one of the mounting cylinders preferably the intake mounting cylinder by a tube 15. The pressure equalizing cell is provided with highly compliant walls so that its internal pressure will reflect closely the external pressure of the reference liquid 2 contained in the vessel 9. The equalizing cell functions just as if it were a wall of the cell itself. In fact, the entire assembly within the vessel 9 may be considered as part of the cell 3 itself.

Secured to the tubes 11 is a balance bridge 16 having a set of fulcrum blades 17 with apexes disposed in a common axis passing through the approximate center of movement of the tubes 11 with respect to the diaphragms 12. The fulcrum blades rest on the upper surfaces of bearing plates 18 secured to the mounting cylinders 13.

Extending in the opposite direction from the hydrometer cell 10 and joined to the balance bridge 16 is a horizontal counterbalance screw 19 having an adjustable weight 20. Also, if desired, a vertical counterbalance screw 21 having a weight 22 may be provided.

Movement of the hydrometer cell 10 may be detected by an armature 7 and pole pieces 8 as shown in connection with FIGS. 1 and 2. If a null balance system is desired, a collar 23 may be fastened to one of the tubes 11 near the center of gravity of the hydrometer cell 10. Attached to the collar 23 is a loop chain weight 24 the other end of which is joined to a traveler nut 25 mounted on a vertical screw shaft 26 accessible from the exterior of the vessel 9 and guided within a slotted sleeve 27.

Operation of the construction shown in FIGS. 3 through 6 is essentially the same as that shown in FIGS. 1 and 2 with the provision of adjustment for liquids of different specific gravity ranges and provision for null balance reading, also greater accuracy may be attained if this is required.

Figures 6, 7:
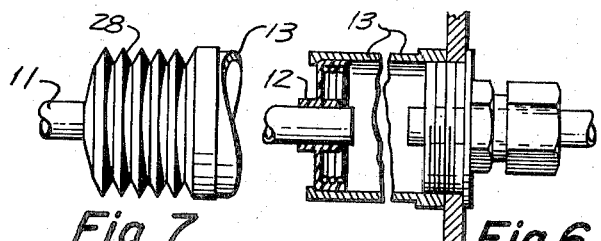

As indicated in FIG. 7 a bellows 28 may be substituted for each diaphragm 12. In this regard bellows 28 may be connected to the supporting tubes 4 and substituted for the coils 5 of the construction shown in FIGS. 1 and 2.

Figure 8:
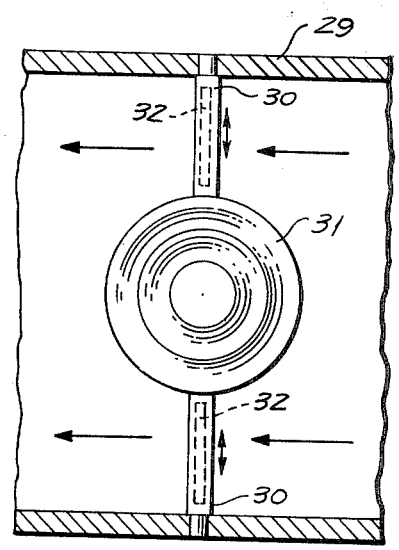
FIG 8 is directed to an embodiment of the hydrometer intended to be mounted in a conduit to measure the specific gravity of liquid flowing around the hydrometer, the conduit being shown in section and the hydrometer in side elevation.

References are now directed to FIG. 8. The construction here shown is adapted for measuring the change of specific gravity of a gas free liquid flowing in a conduit 29. In this case a pair of opposed supporting bars 30 positions a hydrometer cell 31 in the center of the conduit 29. In this case the hydrometer cell is completely filled with a reference liquid rather than the sample liquid as in the previously described embodiments. Conventional electrical strain gages 32 are positioned in the supporting bars 30 or mounted thereon to sense the specific gravity, or changes therein, of the sample liquid flowing around and past the cell 31. In order to minimize the kinetic effect of the flowing sample liquid, the hydrometer cell 31 and supporting bars 30 may be suitably shrouded in a streamlined envelope now shown.

Figure 9:
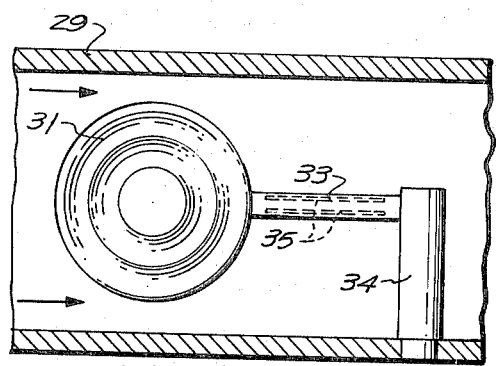
FIG. 9 is another embodiment of the hydrometer intended to measure the specific gravity of liquid flowing around the hydrometer, the conduit for the liquid being shown in section and the hydrometer in side elevation.

References are now directed to FIG. 9. In this construction the conduit 29 and hydrometer cell 31 may be considered the same as in FIG. 8. In this case, however, the downstream side of the hydrometer cell is provided with a horizontal bar 33 joined to a vertical mounting post 34. In order to detect bending movement of the horizontal bar 33 a pair of strain gages 35 are provided on the upper and lower surfaces of the bar to sense the specific gravity, as or changes therein, of the sample liquid flowing around and past the cell. in this case also the hydrometer cell may be shrouded by a suitable streamlined shell not shown.

References are now directed to FIGS. 10, 11 and 12. In this embodiment a soft wall cell 36 is illustrated, which as in the previous embodiments is highly compliant and offers a little or no resistance to pressure differential across its walls. The cell 36 is completely filled with a reference liquid 37. The upper end of the soft wall cell is provided with a low density counterbalance cell 38, whereas the lower end of the soft wall cell is provided with a higher density counterbalance cell 39. Either or both counterbalance cells may be used. The low density counterbalance cells are filled with a liquid or solid material, or both, of appropriate density and total mass. Either or both counterbalance cells may be used to adjust, to desired values, the net thermal expensivity or compressibility, or both, of the soft wall hydrometer.

The soft wall cell is surrounded by a liquid sample 40 to be measured, contained within a suitable vessel represented by a wall 41. Secured to the lower end of the soft wall cell 36 or to the lower counterbalance cell 39 is a flexible counterbalance link 42, which may be in the form of a chain. The extended end of the link is attached to a traveling nut 43, mounted on an adjustment screw 44, contained within a slotted sleeve 45. The adjustment screw is rotatable by a screw drive 46. A suitable reference mark 47 is provided on the cell and with the adjustment screw fixed, change in the elevation of the reference mark may be measured optically by reference to a scale 48 behind the cell if the cell and reference liquid is transparent, or otherwise at one side. Also the reference mark may be maintained at a constant level and the adjustment screw 44 may be moved, the amount of movement being measured by measuring movement of the screw drive 46.

Reference is now directed to FIGS. 13 through 18. The construction here illustrated is a refinement of the previously described structure, particularly in relation to the nature of the counterbalance means. This embodiment includes the hydrometer cell 48 having highly compliant walls. Placed in the cell 48 in addition to the reference liquid 37 is a precise quantity of low density counterbalance media 49. It has been discovered that minute beads of glass which contain entrapped air provide a low density counterbalance media which may be accurately proportioned. These spheres may have a diameter in the order of 0.001 inch. Such micro beads are commercially available and entrap sufficient air to be buoyant in water yet because of their small size no significant expansion or contraction occurs due to change in pressure of the air so that, insofar as their use in the hydrometer cell is considered, they may be considered as low density solid members having thermal and compressive behavior of glass. This is important as the presence of a free gas in the cell disturbs the specific gravity measurement.

The hydrometer cell 48 may also contain a high density counterbalance media 50 which may be a solid metal such as lead or stainless steel or a liquid metal such as mercury.

Depending from the cell 48 is a gage wire 51 having a reference loop or disc 52. The gage wire extends through a transparent scale sleeve 53 supported from a scale plate 54. A counterbalance chain 55 is secured to the lower end of the gage wire 51 and to the scale plate 54.

As is the case with the construction shown in FIGS. 10, 11 and 12, the hydrometer cell 48 and the associated structure is totally immersed in a liquid 40 to be measured, contained within a vessel represented by the wall 41.

The construction shown in FIGS. 13 through 18 is capable of extremely accurate measurement of specific gravity. Tests have indicated that accuracy in the order of one part per million may be attained under laboratory conditions. More specifically a cell 48 having an approximate volume of 315 ml made of polypropylene having a volume of 28 ml and containing a total volume of the medias 49 and 50 of approximately 22 ml (all at atmosphere pressure and room temperature) was constructed. The low density media volume was small Pyrex cells which were the equivalent created by Pyrex micro beads comprising the media 49, the high density media 50 comprised chemical lead and stainless steel. The reason for use of the selected media was to compensate for the difference between the bulk density of the polypropylene and that of water, and also to adjust the net thermal expansion coefficient and the compressibility of the cell when filled with water to equal as a whole corresponding coefficients for water. Extremely accurate compensation was accomplished principally by the low density media which could be added or subtracted by minute amounts.

The intention here was to measure minute changes in water density due to pollution within a test temperature range of 20°C ± 2°C and wherein the measurements were to be made within an immersion depth of 10 feet ± 2 feet. The net thermal expansion of the cell was controlled by use of the low density and high density media which could be added or subtracted by minute amounts to produce compensation of the plastic cell 48 within 0.2 parts per million in specific gravity reading per degree centigrade for a tested temperature range from 18°C to 30°C. Correspondingly, the net compressibility of the ballasted cell was approximately 0.2 parts per million in specific gravity reading per PSI at room temperature corresponding to approximately 0.1 parts per million in specific gravity reading per foot at the selected immersion depth.

Reference is next directed to FIG. 19, which illustrates an emergent stem type of my soft wall hydrometer. The hydrometer here illustrated includes a soft wall cell 56. The wall of the cell may be formed of yieldable plastic material or formed of metal. In the latter case, the configuration being such that the metal offers minimum resistance to the deflection. The cell is completely filled with a reference liquid 57. A hollow stem 58 closed at its end, and also completely filled with the reference liquid, extends from one end of the cell. In FIG. 19, the stem is shown as directed upwardly. Suitably supported over the stem 58, and a portion of the cell 56, is an inverted container 59, connected intermediate its ends to a supply line 60. The container and cell are immersed in a sample liquid 61 and the upper portion of the container is filled with a comparison liquid, or second reference liquid 62, of lower density than the sample liquid. The liquids 61 and 62 are selected so as to be immiscible and therefore define an interface 63 therebetween. Specific gravity may be measured optically by use of a reference mark 64 on the stem. Movement of the mark may be noted, if the interface 63 is maintained constant, or the interface may be raised or lowered by adding or subtracting comparison fluid through the line 65, so as to maintain the reference mark at a uniform height.

Reference is now directed to FIG. 20. In this case, the stem 58 is directed downward and the cell 56 and its stem are positioned in an upright container 65. In this case, the comparison liquid or second reference liquid 66 has higher density than the sample liguid 61 and preferably the reference liquid 57 has a density equal to or less than the sample liquid 61. The position of the hydrometer may be detected in the same manner as that indicated in connection with FIG. 19. Alternatively, the stem 58 may contain an armature 67 and its sensing coils 68 may be immersed in the comparison liquid 66.

Reference is now directed to FIGS. 21 through 24. The hydrometer here illustrated is intended primarily for the measurement of liquids available only in very small quantity and is intended primarily for the measurement of a specific gravity to medical precision for such liquids as tears, sweat, premature infant urine, urine and other body fluids from humans or laboratory animals. It is also desirable that such a hydrometer is to be expendable.

The hydrometer cell 69 in this embodiment is preferably a capillary tube of known volume. The liquid to be measured is drawn into the cell by capillary action. The ends are sealed by semi-solid plugs 70. A satisfactory material for this purpose is agar which is applied by wiping the ends of the cell over an agar coating on a glass plate or the like. Other gelatinous substances may be used which are insoluble in the sample liquid or at least sufficiently insoluble not to dissolve appreciably in the sample liquid or reference liquid during the period required for test.

Alternatively as indicated in FIG. 23, the ends of the cell may be fitted with free moving pistons 71. Such pistons are feasible as the pressure differential between the sample liquid and the reference liquid is intended to be zero and thus slight clearance between the piston and walls of the cell restrict the diffusion of one liquid into the other to a negligible level during the test period. The pistons are of known volume and physical proportions. When the pistons are inserted in the ends of the cells, they displace a known volume of the sample liquid. The pistons are pressed inward until flush with the ends of the cell. This is easily accomplished as pressure cannot be applied to the pistons once they are flush with the ends of the cell without use of a pointed instrument. Also it should be noted that the very act of capillary action insures a gas free liquid and thus eliminates the presence of any gas that might expand and push the pistons outward. If a cell larger than capillary size is used, care is taken to be sure that the sample liquid is gas free as is the case with the contents of the cells in the other embodiments of this invention.

To determine specific gravity the cell is placed in a reference liquid not shown in which is fully immersed a scale structure. In this case the scale structure itself may be of an expendable nature. More specifically, the scale structure includes a scale frame formed of wire and comprising a pair of scale beams 72 having fulcrum offsets 73 which rest on a V-shaped fulcrum blade 74. One end of the frame is provided with offset portions 75 which support the hydrometer cell. The other ends of the beams comprising the frame are joined together to form a pointer 76 for cooperation with a scale 77.

In order to obtain maximum sensitivity the material comprising the wall of the hydrometer cell 48 is matched to the reference liquid; that is, the wall has the same density as the liquid at the temperature and pressure under which the test is conducted. For example, the reference liquid may be a mixture of bromo-form and absolute ethyl alcohol. If so, the walls of the tube may be made of Pyrex glass. Alternatively, the wall of the cell 48 may be formed of polypropylene in which case the reference liquid may be a dilute solution of alcohol in water. It is, of course, necessary that the end plug 70 be as insoluble in the reference liquid as in the sample liquid.

In some conditions the net weight of the cell 48 and its contents may be less than that of the reference liquid displaced by the cell. If this be the case a compensating collar or ring 78 is placed on the cell 69 to increase the net weight by a predetermined amount, which amount is reflected in the scale 77.

Reference is now directed to FIGS. 26, 26 and 27. This construction also lends itself particularly to laboratory use. This construction utilizes a soft wall cell 78 from which extend coaxial integral tubular stems 79. The sample liquid 80 may be drawn into the soft wall cell by immersing one stem in a body of the sample liquid and applying a vacuum to the other stem. One of the stems is closed by a conical pointer tip 81, whereas the other is provided with a seal cap 82, preferably including a screw thread 83 for attachment to an eyelet 84, or other fulcrum means. The eyelet 84 may be freely pivoted on a fulcrum post 85. The hydrometer is immersed in reference liquid 86, and an arcuate scale 87 is located for cooperation with the pointer 81.

The soft wall cell 78 may be bridged by a counterweight strap 88, which is provided with a counterweight 89. This simplifies the separation between the centers of gravity and of buoyancy that is required for an angular hydrometer of this type. In this connection, it should be noted that the counterweight may be positive or negative in effect; that is, it may be heavier or lighter than the liquid in which it is immersed.

It should be noted that in the embodiment shown in FIGS. 25, 26 and 27, the sample liquid is inside the cell and reference liquid outside; however, the liquids may be reversed.

Reference is now directed to FIG. 28. In this construction, the force exerted on the hydrometer is opposed by a torsion wire 90, joined at one end to an anchor 91 and equipped with a dial 92 at its other end, in such a manner that the wire may be placed under tension and twisted about its axis. Mounted on the wire is a connector disk 93 to which is attached, intermediate its ends, a lever arm 94. One end of the lever arm is provided with a counterweight 95, the other end with a soft wall cell 96. In this case the cell is shown as a cylinder with corrugated side walls, so as to transmit any outside pressure to the reference liquid contained therein. A pointer 97 and a cooperating scale 98 may be provided so as to measure the position of the cell when immersed in a sample liquid.

All of the embodiments shown and described permit accurate and direct measurement of specific gravity in which variables that would affect the accuracy of measurement or would require separate measurements to obtain a connection factor are eliminated. Such accurate measurement is accomplished by use of the following steps, where applicable:

1. Providing compliant walls for the hydrometer cell or significant portions thereof or for a separate but connected cell to insure essentially identical pressures inside and outside the cell.

2. Providing cell walls of sufficient heat conductivity as to insure essentially identical temperatures inside and outside the cell under the conditions of test. This does not exclude glass or plastic walls, as the walls may be quite thin and test conditions may permit the required time factor.

3. Completely filling the available space within the cell with either the reference liquid or sample liquid to the exclusion of any free gas. The air enclosing glass balls of the embodiment shown in FIGS. 13 through 18 completely isolate the enclosed air from the liquid within the cell so that the balls may be considered as solid spheres with respect to temperature and pressure changes.

4. Matching thermal expansion characteristics as well as the compressibility of the sample liquid and reference liquid.

5. Matching the thermal expansion characteristics as well as the compressibility of the cell walls with one of the liquids, preferably the reference liquid.

6. Completely immersing the cell as well as the measuring means in the external liquid, whether the external liquid by the sample, a reference liquid or a companion liquid, then measuring the buoyancy (positive or negative) of the cell including the parts of the measuring means, or effecting null buoyancy of the cell and measuring the adjustment required.

The method of effecting measurement of specific gravity as exemplified in the various embodiments shown and described consists essentially in performing steps selected from the preceding numbered paragraphs.

It should be noted that if the design accuracy requires, compensating media such as indicated in conjunction with the embodiments shown in FIGS. 10 through 18 may be incorporated in the embodiments of the invention.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A hydrometer comprising:
a. a cell having compliant and heat conductive walls to effect essentially equal temperatures and pressures internally and externally of the cell;
b. a first liquid completely filling the space in the cell otherwise available to a gas to exclude all gas exposed to the interior of the cell;
c. a container for receiving the cell, the cell being mounted for limited, essentially vertical movement with respect to the container;
d. a second liquid in the container completely surrounding the cell;
e. one of the liquids being a sample liquid, the other being a reference liquid selected for the specific gravity measurement of the sample liquid;
f. means including an electromagnetic means submerged in the external liquid for measuring sensing the position of the cell and its contents in the surrounding container to determine the specific gravity of the sample liquid;
g. and an inlet and an outlet tube connected to the cell and extending outside the container for connection to the source of sample liquid for flow of the sample liquid through the cell.

2. A hydrometer, comprising:
a. a cell having compliant and heat conductive walls to effect essentially equal temperatures and pressures internally and externally of the cell;
b. a conduit for receiving the cell and containing a sample liquid completely surrounding the cell;
c. a reference liquid selected for specific gravity measurement of the sample liquid contained in the cell;
d. a stem fixed at one end with respect to a wall of the conduit and connected at its other end to the cell to form a support therefor;
e. and a strain gauge carried by the stem to determine the specific gravity of the sample liquid.

3. A hydrometer, comprising:
a. a cell having compliant and heat conductive walls to effect essentially equal temperatures and pressures internally and externally of the cell;
b. a container for receiving the cell and containing a sample liquid completely surrounding the cell;
c. a first reference liquid selected for specific gravity measurement of the sample liquid and completely filling the cell;
d. an enclosure cupped at one end, open at its other end and disposed around one end of the cell;
e. a second reference liquid of different density than the sample liquid and partly filling the enclosure, the second reference liquid being immiscible with the sample liquid to form an interface therewith intermediate the ends of the cell;
f. and means submerged in the sample liquid for measuring displacement of the cell and its contents in the container to determine the specific gravity of the sample liquid.

4. A hydrometer comprising:
a. a tubular cell initially open at its ends for introduction of a sample liquid therein and closing the ends of the tubular cell having compliant and heat conductive walls to effect essentially equal temperatures and pressures internally and externally of the cell;
b. a sample liquid completely filling the space in the cell available to a gas to exclude all gas exposed to the interior of the cell;
c. a container for receiving the cell;
d. a reference liquid selected for the specific gravity measurement of the sample liquid disposed in the container and completely surrounding the cell;
e. and means submerged in the reference liquid for measuring displacement of the cell and its contents in the surrounding container to determine the specific gravity of the sample liquid;
f. the cell being a length of capillary tubing;

g. and the compliant walls being semi-solid material applied to the ends of the tubing.

5. A hydrometer, comprising:
a. a tubular cell initially open at its ends for introduction of a sample liquid therein and closing the ends of the tubular cell having compliant and heat conductive walls to effect essentially equal temperatures and pressures internally and externally of the cell;
b. a sample liquid completely filling the space in the cell available to a gas to exclude all gas exposed to the interior of the cell;
c. a container for receiving the cell;
d. a reference liquid selected for the specific gravity measurement of the sample liquid disposed in the container and completely surrounding the cell;
e. and means submerged in the reference liquid for measuring displacement of the cell and its contents in the surrounding container to determine the specific gravity of the sample liquid;
f. the compliant walls being plugs slidably received in the ends of the tubing.

6. A hydrometer, comprising:
a. a tubular cell initially open at its ends for introduction of a sample liquid therein and closing the ends of the tubular cell having compliant and heat conductive walls to effect essentially equal temperatures and pressures internally and externally of the cell;
b. a sample liquid completely filling the space in the cell available to a gas to exclude all gas exposed to the interior of the cell;
c. a container for receiving the cell;
d. a reference liquid selected for the specific gravity measurement of the sample liquid disposed in the container and completely surrounding the cell;
e. and means submerged in the reference liquid for measuring displacement of the cell and its contents in the surrounding container to determine the specific gravity of the sample liquid;
f. the density of the reference liquid surrounding the tubular cell and the density of the walls thereof being matched.

7. A hydrometer, comprising:
a. a cell having compliant and heat conductive walls to effect essentially equal temperatures and pressures internally and externally of the cell;
b. a first liquid completely filling the space in the cell otherwise available to a gas to exclude all gas exposed to the interior of the cell;
c. a container for receiving the cell;
d. a second liquid in the container completely surrounding the cell;
e. one of the liquids being a sample liquid, the other being a reference liquid selected for the specific gravity measurement of the sample liquid;
f. and means submerged in the external liquid for measuring displacement of the cell and its contents in the surrounding container to determine the specific gravity of the sample liquid;
g. tubular stems projecting from opposite ends of the cell, the stems being initially open whereby the cell and stems may be filled with one of the liquids;
h. caps closing the extremities of the stems;
i. and the measuring means including a pivot for the extremity of one of the stems, a pointer for the extremity of the other stem and a scale positioned for cooperation with the pointer.

8. A hydrometer, comprising:
a. a cell having compliant and heat conductive walls to effect essentially equal temperatures and pressures internally and externally of the cell;
b. a first liquid completely filling the space in the cell otherwise available to a gas to exclude all gas exposed to the interior of the cell;
c. a container for receiving the cell;
d. a second liquid in the container completely surrounding the cell;
e. one of the liquids being a sample liquid, the other being a reference liquid selected for the specific gravity measurement of the sample liquid;
f. and means submerged in the external liquid for measuring displacement of the cell and its contents in the surrounding container to determine the specific gravity of the sample liquid;
g. said measuring means including a torsion wire; a cross rod secured to the cell at one end and a counterbalance at its other end; and means for measuring the torsion force exerted by the torsion wire.

* * * * *